June 18, 1963    W. K. M. KLEINE    3,094,016
TREPANNING AND BORING HEAD
Filed Nov. 20, 1959    2 Sheets-Sheet 1
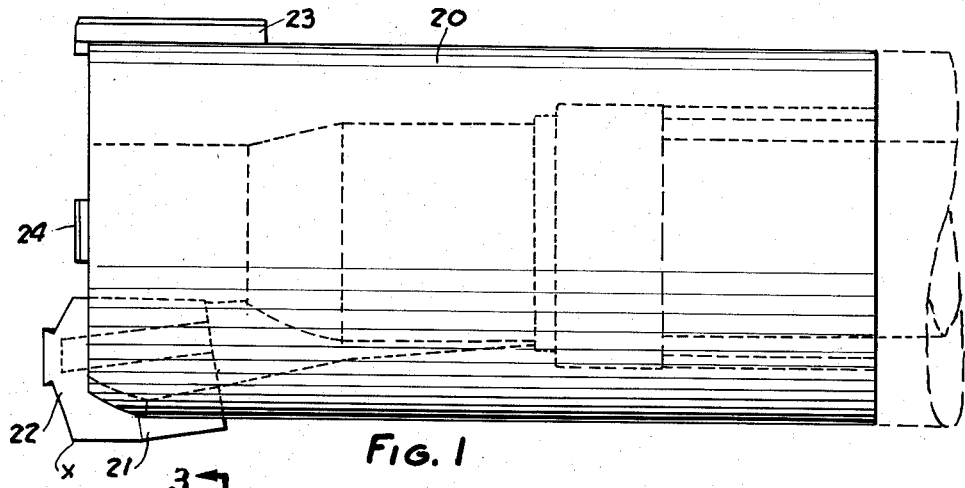
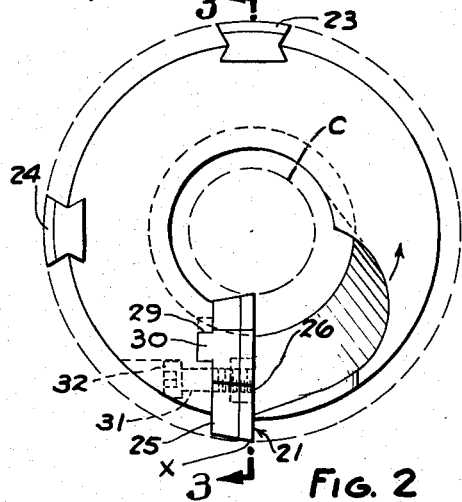
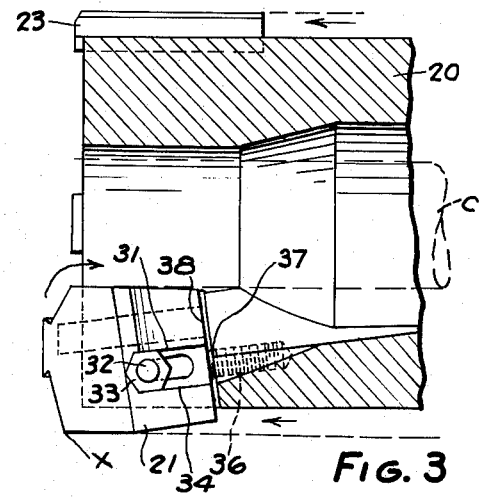
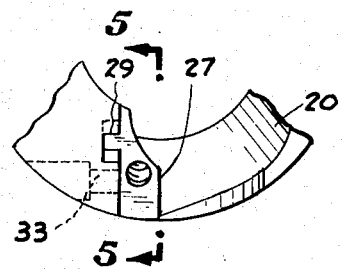
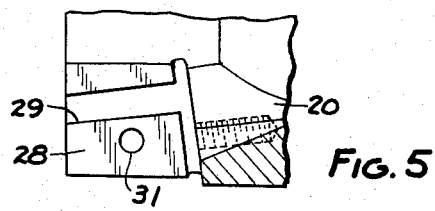
INVENTOR.
WERNER KURT MAX KLEINE
BY
Barnes, Kisselle, Raisch & Choate
ATTORNEYS June 18, 1963 W. K. M. KLEINE 3,094,016
TREPANNING AND BORING HEAD
Filed Nov. 20, 1959 2 Sheets-Sheet 2

INVENTOR.
WERNER KURT MAX KLEINE
BY
Barnes, Kisselle, Raisch & Choate
ATTORNEYS

United States Patent Office 3,094,016
Patented June 18, 1963

3,094,016
TREPANNING AND BORING HEAD
Werner Kurt Max Kleine, Am Roggenber,
Bremen-Mahndorf, Germany
Filed Nov. 20, 1959, Ser. No. 854,492
16 Claims. (Cl. 77—69)

This invention relates to forming accurately deep holes by boring and particularly to trepanning, solid boring, counter boring and finish boring.

Trepanning is the term commonly used to describe the system of deep-hole boring wherein a hollow cylindrical head is mounted on the end of the hollow boring bar and a generally radial cutting tool is supported by a cutter body on the head. Guide pads are provided at circumferentially spaced points on the head. The trepanning head is moved into contact with the end of the workpiece and caused to rotate relative to the workpiece. Since the radial extent of the cutting tool is less than the radius of the hole being bored, a core of material is cut out of the workpiece. According to the latest method of trepanning, coolant is caused to flow around the exterior of the trepanning head to the cutting tool and is removed through the interior of the trepanning head thereby carrying the chips away.

In such a trepanning head, the cutter body is customarily mounted on the head by an arrangement which includes a shaft on the cutter body which engages an axially extending hole in the trepanning head parallel to the axis of the head. A set screw engages the cutter body and thereby holds the cutter body in position.

Tests of such trepanning operations indicates that although satisfactory bores are produced there is a slight deviation in the diameter of the bore which has been formed due to a slight radial movement of the cutter body. This deviation is apparently due to, first, the inaccuracy which is involved in forming the hole in the trepanning head into which the shaft of the cutter body extends and, second, a deformation of the shaft center line relative to the center line of the cutter body.

In addition to the aforementioned difficulty in the present method of trepanning, it has been found that it is impossible to reuse the cutters even if they are reground to provide new cutting edges the diameter generated by the cutter is reduced when the cutter is again placed in position on the trepanning head due to the wear on the periphery of the cutter.

It is therefore an object of this invention to provide a novel trepanning head structure wherein there is a positive control of the position of the cutter body on the trepanning head.

It is a further object of the invention to provide such a trepanning head wherein the cutter may be reground and still used on the same trepanning head to produce bores of the same diameter.

It is a further object of the invention to provide a trepanning head structure wherein the cutter body may be remounted on the trepanning head after regrinding to produce a diameter of the original size with ease and a maximum of accuracy.

At the present time deep holes can also be produced by solid boring which comprises using a cutter body and pad arrangement similar to that used in trepanning except that the radial extent of the cutter body is greater than the radius of the hole being cut so that the entire hole is cut rather than producing a removable core as in trepanning. Counter boring and finish boring of deep holes can also be accomplished by utilizing a head and cutter body similar to that used for solid boring. The same problems mentioned above with regard to trepanning heads exist in the boring heads used for such deep-hole boring and it is therefore an object of this invention to provide a boring head structure which will fulfill the aforementioned objects set forth with regard to a trepanning head structure.

Basically, the trepanning and boring heads embodying the invention comprise a track formed on each head with its axis forming an angle with the axis of the head and interengaging means on the cutter body for engaging the track. In addition, the novel structure comprises means for adjustably mounting the cutter body on the track. It is thus possible to position the cutter body in a selected axial position on the track which is inclined to the axis of the head. In this manner, the cutter body is positively held on the cutter head. In addition, it is possible to remove the cutter body for regrinding of the cutter and to replace the cutter body on the head adjusting its position so that the periphery of the cutter will generate a diameter which is identical to that of the original cutter so that the head will bore a hole having the same diameter.

In the drawings:

FIG. 1 is a side elevation of a trepanning head embodying the invention.

FIG. 2 is an end view of the trepanning head.

FIG. 3 is a fragmentary sectional view taken along the line 3—3 in FIG. 2.

FIG. 4 is a fragmentary end view of the trepanning head shown in FIG. 2 with the cutter body removed.

FIG. 5 is a fragmentary sectional view taken along the line 5—5 in FIG. 4.

Figure 6:
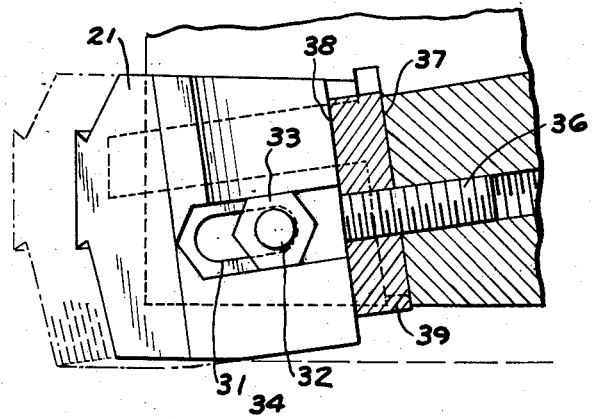
FIG. 6 is a fragmentary sectional view similar to FIG. 3 showing in broken lines some of the adjustable positions of the cutter body.

Referring to FIGS. 1 and 2, trepanning head 20 is generally cylindrical and is adapted to be mounted on the end of a hollow boring bar (not shown). The trepanning head 20 is hollow and a steel cutter body 21 having a carbide tipped cutter 22 is fixed on the periphery of the head 20 at one end thereof. The body 21 is made by machining or investment casting and the cutter 22 of suitable carbide, ceramic or high speed steel is brazed on body 21. Carbide guide pads 23, 24 are provided at circumferentially spaced points on the end of head 20, pad 23 being preferably diametrically opposite cutter body 21 and pad 24 being located intermediate pad 23 and cutter 21.

The trepanning head is adapted to be used by bringing the head into position adjacent a workpiece and rotating the head relative to the workpiece causing the cutter 22 to cut out an annular area in the workpiece leaving a core C (FIG. 3). When the hole is formed completely through the workpiece the core is thereby detached from the workpiece and may be removed. In the preferred method, coolant liquid is passed around the exterior of head 20 between the head and the workpiece and removed from the interior of the head as shown by the arrows in FIG. 3, not only cooling the cutter 22 but, in addition, removing the chips. As shown in dotted lines in FIG. 1, the longitudinal opening in head 20 is generally cylindrical adjacent the tool end and thereafter diverges to provide for free and unobstructed flow of coolant and chips away from the cutter.

Figure 7:
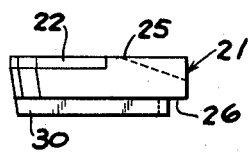
FIG. 7 is a side view of the cutter body.
Figure 8:
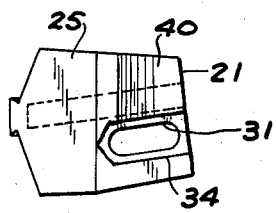
FIG. 8 is a plan view of the cutter body.

Referring to FIGS. 2–5, according to the invention, the cutter body 21 comprises substantially flat parallel surfaces 25, 26 (FIG. 7) and is adapted to be positioned in an axially extending rectangular slot 27 in the end of head 20. One generally radial face 28 of slot 27 is provided with a track in the form of a rectangular slot 29 which is inclined to the axis of the cutter body 20 with its axis intersecting the axis of the cutter body 21. Cutter body 21 is provided with a complementary rectangular key 30 which engages the slot 29 and thereby guides the movement of the cutter body 21 on the trepanning head 20. The cutter body is also provided with an opening 31 which is elongated in the direction parallel to the axis of key 30 and a headed screw 32 extending through the opening 31 into a nut 33 riding in a groove 34 in cutter body 21 locks the cutter body 21 in position on the trepanning head (FIGS. 2, 3 and 6). A tapered portion 40 on surface 25 provides clearance for chips. To prevent rearward movement of the cutter body relative to the trepanning head 20, a shim 39 is provided between the base surface 37 of slot 27 and the rear end 38 of cutter body 21 limiting its rearward movement. A locating screw 36 is threaded into the base surface 37 of slot 27 with its axis parallel to and aligned with the axis of track 29. The outer end of screw 36 extends through an opening in shim 39 into engagement with the rear end 38 of the cutter body 21 thereby holding the shim in position. When the head is used, the engagement of the key 30 in the track 29 positively holds the cutter body in rigid position and prevents any oscillation or movement of the cutter body 21 relative to the head. In this manner, a more accurate bore is formed in the workpiece.

Figure 10:
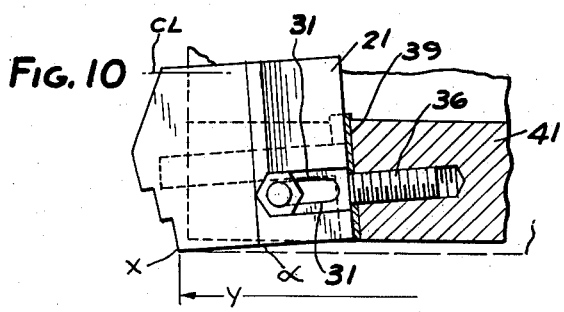
FIG. 10 is a fragmentary sectional elevational view of the boring head shown in FIG. 9.
Figure 9:
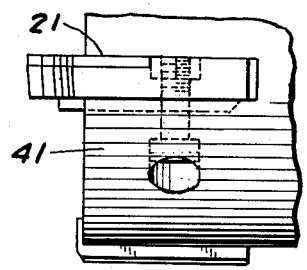
FIG. 9 is a bottom view of a solid boring head embodying the invention.

It should, of course, be understood that the outer cutting edge X of the cutter can be provided with any desired degree of back taper clearance. For example, the cutting edge X may have a zero back taper clearance as shown in FIG. 6.

Where the hole being bored is such as to preclude trepanning, such as a blind hole, then a boring head 41 is used as shown in FIGS. 9 and 10, and cutter 21 is mounted as in FIGS. 1–8 by an identical track and slot construction. The radial extent of cutter 21 is greater than the radius of the hole being bored so that no core is formed. In FIG. 10, the cutter edge 42 has a back rake angle α. Similar arrangements can be used on counter boring and finishing heads.

In addition to the aforementioned advantages of providing a rigid mounting of the cutter body on the trepanning head resulting in improved control of bore diameter and bore concentricity, the aforementioned construction permits the cutter body 21 to be readily removed for regrinding of the cutter 22. For example, when the cutter is originally ground allowing a back taper clearance angle α, as shown in FIG. 10 equal to the angle that the track 29 makes with the axis of the head 41 after the cutter has been reground, the cutter body can be repositioned on the trepanning head, it being only necessary to position the cutter body in such a manner that the diameter which will be described by the cutting edge X is the same as in the original cutter. This position can be readily determined on a trepanning or boring head by measuring the original distance Y from a predetermined point on the head to the cutting edge at X after the cutter 22 has been reground, the cutter body is positioned so that this distance is the same. The edge X will then be properly positioned to cut the required diameter. Shims 39 may be provided between the cutter 21 and the base 37 of slot 27 as needed.

It can thus be seen that this trepanning and boring head construction permits not only the regrinding of the cutter but the ready resetting to cut the original diameter while rigidity holds the cutter in position.

Figure 11:
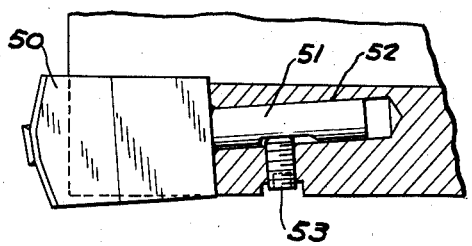
FIG. 11 is a fragmentary sectional elevational view of a modified boring head similar to FIG. 3.

The advantage of easy resetting after regrinding of the cutting edge can also be achieved in a cutter of the prior art construction which utilizes a shaft on the cutter body by inclining the axis of the hole into which the shaft extends. Specifically, as shown in FIG. 11, cutter 50 has a shaft 51 fixed thereto and extending into a hole 52 which has its axis inclined to the axis of head 20. A set screw 53 locks the cutter in position. After regrinding of the cutting edge, shims may be interposed between cutter 22 and the base of slot 54 in which the cutter is positioned to reestablish the original cutting diameter.

Although the surfaces of the slot 27 and the surfaces 25, 26 of the cutter body 21 have been described as being parallel and complementary, it can be appreciated that these surfaces can have other configurations which permit an axial movement of the cutter body 21 in the slot 27, it being only necessary that the surfaces be complementary and accurately engage. Similarly, the slot 29 and key 30 have been shown in the preferred form as having a rectangular cross section. Satisfactory results can be obtained where the slot and key have other cross sections, for example, trapezoidal.

Although the invention has been described in connection with deep hole boring wherein the length of the hole is greater than the diameter of the hole, it is also applicable to boring wherein the length of the hole is less than the diameter of the hole.

I claim:

1. In an apparatus for forming holes wherein a hollow head having a longitudinally extending passage is brought into contact with a workpiece and relative rotation is produced between the workpiece and head about the axis of the head to form the hole, the improvement wherein said head has an axially extending opening therein having generally radial parallel side faces, said opening extending radially inwardly to the passage and radially outwardly to the periphery of said head, one side face of said opening having a generally axially extending key slot formed therein, said key slot being generally rectangular in cross section and being inclined to the axis of said head, a cutter body having generally parallel sides and a cutter on one end thereof, said cutter body being positioned in said opening, a guide key of rectangular cross section on one side of said cutter body intermediate the side edges thereof and interengaging said key slot on said head, and means for clamping said cutter body against said one side face of said opening in adjusted position relative to said key slot.

2. In an apparatus for forming holes wherein a head is brought into contact with a workpiece and relative rotation is produced between the workpiece and head about the axis of the head to form the hole, the improvement wherein said head has an axially extending opening therein in the periphery thereof adjacent one end thereof, one side face of said opening having a generally axially extending key slot formed therein, said key slot inclined to the axis of the head and having its axis intersecting the axis of the head, a cutter body having a cutter thereon and positioned in said opening, a guide key on said cutter body interengaging said key slot in said head, shims interposed between the base of said opening in said head and the inner end of said cutter body, and means for locking said cutter body in adjusted position relative to said key slot comprising a screw, a nut, said cutter body having an opening through which said screw extends into threaded relationship with said nut.

3. The combination set forth in claim 2 wherein said opening in said cutter is elongated in a direction axially of the head.

4. In an apparatus for forming holes wherein a hollow head having a longitudinally extending passage is brought into contact with the workpiece and relative rotation is produced between the workpiece and head about the axis of the head to form the hole, the improvement wherein said head has an axially extending slot in one end thereof, said slot extending radially inwardly to said passage and radially outwardly to the periphery of said head, a cutter body positioned in said slot and having a cutter thereon, means defining a straight generally longitudinally extending track in one of said slot of said head and cutter, interengaging means on the other of said head and cutter for engaging said slot, said track being inclined relative to the axis of said head, said head and said cutter body having complementary spaced contacting surfaces extending generally radially on each side of said track, and means for locking said cutter body in adjusted position relative to said head with said surfaces in contact.

5. In an apparatus for forming holes wherein a hollow head having a longitudinally extending passage is brought into contact with the workpiece and relative rotation is produced between the workpiece and head about the axis of the head to form the hole, the improvement wherein said head has an axially extending slot in one end thereof, said slot extending radially inwardly to said passage and said slot extending radially to the periphery of said head, a cutter body positioned in said slot and having a cutter thereon, means defining a straight key slot in said slot on one of said head and cutter, a straight key on the other of said head and cutter, said key slot being inclined relative to the axis of said head, said head and said cutter body having complementary spaced contacting surfaces extending generally radially on each side of said key slot, and means for clamping said cutter body in adjusted position relative to said head against one of said surfaces.

6. In an apparatus for forming holes wherein a hollow head having a longitudinally extending passage is brought into contact with a workpiece and relative rotation is produced between the workpiece and head about the axis of the head to form the hole, the improvement wherein said head has a flat surface parallel to a radial plane of said head extending to the periphery of said head, said surface having a generally axially extending straight key slot formed therein, said key slot being generally rectangular in cross section and being inclined to the axis of said head, a cutter body positioned in said opening, said body having a straight key engaging said key slot on said head, said cutter body having spaced surfaces along said key engaging said surface on the head, and means for clamping and locking said cutter body against said surface on said head in adjusted position relative to said head.

7. In an apparatus for forming holes wherein a head is brought into contact with a workpiece and relative rotation is produced between the workpiece and head about the axis of the head to form the hole, the improvement wherein said head has an axial opening in one end thereof, a cutter in said opening, said head having an axially extending hole therein in the base of said opening, said cutter having a shaft fixed thereto which extends into said hole, the axis of said hole being inclined to the axis of said head, the angle which the axis of said hole forms with the axis of said head being equal to the back taper angle of said cutter, and means engaging said shaft for locking said shaft and cutter in position.

8. In an apparatus for forming holes wherein a head is brought into contact with a workpiece and relative rotation is produced between the workpiece and head about the axis of the head to form the hole, the improvement wherein said head has an axially extending opening therein having generally radial parallel side faces, one side face of said opening having a generally axially extending key slot formed therein, said key slot being generally rectangular in cross section and being inclined to the axis of said head, a cutter body having generally parallel sides and a cutter on one end thereof, said cutter body being positioned in said opening with the sides thereof engaging the side faces of said opening, a guide key of rectangular cross section on said cutter body interengaging said key slot on said head, and means for locking said cutter body in adjusted position relative to said key slot, the cutter having a back taper angle equal to the angle formed by the axis of said key slot with the axis of said head.

9. In an apparatus for forming holes wherein a head is brought into contact with a workpiece and relative rotation is produced between the workpiece and head about the axis of the head to form the hole, the improvement wherein said head has an axially extending opening therein having generally radial parallel side faces, one side face of said opening having a generally axially extending key slot formed therein, said key slot being generally rectangular in cross section and being inclined to the axis of said head, a cutter body having generally parallel sides and a cutter on one end thereof, said cutter body being positioned in said opening with the sides thereof engaging the side faces of said opening, a guide key of rectangular cross section on said cutter body interengaging said key slot on said head, and means for locking said cutter body in adjusted position relative to said key slot comprising an opening through said body elongated in the direction of the axis of said head, a screw, said head having a hole therein through which said screw extends through said elongated opening in said cutter body, a nut into which said screw is threaded, and means on said cutter body engaging the nut to prevent rotation thereof comprising shims having holes therein and a screw in the base of said opening in said head engaging the base of said cutter body, the axis of said screw being aligned with the axis of the elongated opening in the cutter body.

10. In an apparatus for forming holes wherein a head is brought into contact with a workpiece and relative rotation is produced between the workpiece and head about the axis of the head to form the hole, the improvement wherein said head has a flat surface parallel to a radial plane of said head extending to the periphery of said head, said surface having a generally axially extending straight key slot formed therein, said key slot being generally rectangular in cross section and being inclined to the axis of said head, a cutter body positioned in said opening, said body having a straight key engaging said key slot on said head, said cutter body having spaced surfaces along said key engaging said surface on the head, and means for clamping and locking said cutter body in adjusted position relative to said head with said surfaces on said cutter body engaging said surface on said head, said cutter having a back taper angle equal to the angle formed by the axis of said key slot with the axis of said head, said head having an axial opening therein being inclined to the axis of said head at the same angle as the axis of said key slot, and a back up screw threaded into said opening and adapted to engage the base of said cutter body.

11. The combination set forth in claim 10 wherein said means for locking said cutter body in adjusted position comprises an opening through said body, a screw, said head having a hole therein through which said screw extends through said opening in said cutter body, a nut into which said screw is threaded, and means on one of said cutter body and said head engaging the nut to prevent rotation thereof.

12. In an apparatus for forming holes wherein a hollow head having a longitudinal passage therein is brought into contact with a workpiece and relative rotation is produced between the workpiece and the head about the axis of the head to form the hole, the improvement wherein said head has an axially extending slot in one end thereof, said slot extending radially inwardly to said passage and radially outwardly to the periphery of said head, a cutter body positioned in said slot and having a cutter thereon, means defining a generally longitudinally extending track in one of said slot of said head and said cutter, interengaging means on the other of said head and cutter for engaging said track, said head and cutter body having complementary contacting surfaces extending generally radially on each side of said track, and means for locking and clamping said cutter body in adjusted position relative to said head with said surfaces in contact.

13. The combination set forth in claim 12 wherein said track is formed by a generally rectangular slot, said interengaging means comprising a complementary rectangular key.

14. In a boring head, a cutter body having a generally radial cutter thereon including longitudinal and radial cutting edges, said body including a key on one side thereof extending longitudinally thereof and adapted to engage a slot in a boring head, said body having a transverse hole therein to facilitate locking said body in position on said boring head and means forming a part of and on the other side of said body opposite said key comprising two substantially straight contacting surfaces for engaging a nut or the like to prevent its rotation, 15. The cutter body set forth in claim 14 wherein said last-mentioned means comprises a groove in said body having said contacting surfaces therein for engaging and holding said nut or the like.

16. A cutter body for a boring head, said body having a generally radial cutter thereon having longitudinal and radial cutting edges, said body including a straight key on one side thereof extending longitudinally thereof and adapted to engage a slot in a boring head, said body having spaced surfaces along the opposite sides of said key lying in a single plane, said surfaces being adapted to engage complementary surfaces on a boring head, said body having a transverse hole therein to facilitate locking said body in position on said boring head and means forming a part of and on the other side of said body opposite said key comprising two substantially straight contacting surfaces for engaging a nut or the like to prevent its rotation.

References Cited in the file of this patent

UNITED STATES PATENTS

| | | |
|---|---|---|
| 895,219 | Whittemore et al. | Aug. 4, 1908 |
| 1,083,492 | Hundrieser | Jan. 6, 1914 |
| 1,284,593 | Cashman | Nov. 12, 1918 |
| 1,468,774 | Caldwell | Sept. 25, 1923 |
| 2,400,856 | Thompson | May 21, 1946 |
| 2,463,063 | Smith | Mar. 1, 1949 |
| 2,791,921 | Heppenstall et al. | May 14, 1957 |
| 2,869,405 | Wolfe | Jan. 20, 1959 |